(12) United States Patent
Kim et al.

(10) Patent No.: US 11,157,039 B2
(45) Date of Patent: Oct. 26, 2021

(54) DISPLAY DEVICE

(71) Applicant: LG ELECTRONICS INC., Seoul (KR)

(72) Inventors: Hansoo Kim, Seoul (KR); Woohyun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/044,272

(22) PCT Filed: Aug. 28, 2019

(86) PCT No.: PCT/KR2019/010980
§ 371 (c)(1),
(2) Date: Sep. 30, 2020

(87) PCT Pub. No.: WO2020/096184
PCT Pub. Date: May 14, 2020

(65) Prior Publication Data
US 2021/0072788 A1 Mar. 11, 2021

(30) Foreign Application Priority Data

Nov. 9, 2018 (KR) .................. 10-2018-0136971
Aug. 28, 2019 (KR) .................. 10-2019-0105654

(51) Int. Cl.
*G06F 1/16* (2006.01)
*A47B 81/06* (2006.01)
(Continued)

(52) U.S. Cl.
CPC .............. *G06F 1/1605* (2013.01); *A47B 81/06* (2013.01); *G06F 1/1611* (2013.01); *G06F 1/181* (2013.01); *H05K 5/0017* (2013.01)

(58) Field of Classification Search
CPC ...... G06F 1/181; G06F 1/1605; G06F 1/1611; H05K 5/0017; A47B 81/06
See application file for complete search history.

(56) References Cited

U.S. PATENT DOCUMENTS 5,351,176 A * 9/1994 Smith ..................... G06F 1/181
248/917
6,219,229 B1 * 4/2001 Lee ........................... G06F 1/18
361/679.08
(Continued)

FOREIGN PATENT DOCUMENTS

KR 2020100011334 11/2010
KR 101249731 4/2013
(Continued)

OTHER PUBLICATIONS

PCT International Application No. PCT/KR2019/010980, Notification of Transmittal of the International Search Report and the Written Opinion of the International Searching Authority, or Declaration dated Dec. 24, 2019, 11 pages.

*Primary Examiner* — Nidhi Thaker
(74) *Attorney, Agent, or Firm* — Lee, Hong, Degerman, Kang & Waimey

(57) ABSTRACT

A display device comprises: a cabinet including a receiving part having an open front surface; a movable plate disposed in the front of the receiving part to be slidable to the left or right and including a first opening formed to be vertically elongated; a display module held on the front surface of the movable plate to selectively cover the front surface of the receiving part according to a position of the movable plate; and a mount bracket fixed onto the rear surface of the display module and having one end which is inserted into the first opening and is then lowered to be fastened to the movable
(Continued)

plate, whereby the display device can easily hold a display module and improve use of a space.

11 Claims, 8 Drawing Sheets

(51) Int. Cl.
*G06F 1/18* (2006.01)
*H05K 5/00* (2006.01)

(56) References Cited

U.S. PATENT DOCUMENTS

| | | | |
|---|---|---|---|
| 6,754,070 B2* | 6/2004 | Chen | B60R 11/02 |
| | | | 361/679.26 |
| 8,687,362 B2* | 4/2014 | Zhao | G06F 1/1628 |
| | | | 361/679.55 |
| 9,727,096 B1* | 8/2017 | Truong | G06F 1/181 |
| 2010/0328872 A1* | 12/2010 | Chou | H05K 7/1494 |
| | | | 361/679.08 |
| 2014/0120773 A1 | 5/2014 | Crawford et al. | |

FOREIGN PATENT DOCUMENTS

| | | | |
|---|---|---|---|
| KR | 101426522 | | 8/2014 |
| KR | 20170002879 U | * | 8/2017 |
| KR | 2020170002879 | | 12/2017 |

* cited by examiner (a)

(b) (c)

(a)

(b)

(a)

(b)

(a)

(b)

DISPLAY DEVICE

CROSS-REFERENCE TO RELATED APPLICATIONS

This application is the National Stage filing under 35 U.S.C. 371 of International Application No. PCT/KR2019/010980, filed on Aug. 28, 2019, which claims the benefit of earlier filing date and right of priority to Korean Application Nos. 10-2018-0136971, filed on Nov. 9, 2018, and 10-2019-0105654, filed on Aug. 28, 2019, the contents of which are all hereby incorporated by reference herein in their entirety.

TECHNICAL FIELD

The present disclosure relates to a display device having a display module slidably movable on a front face of a storage cabinet.

BACKGROUND ART

In general, a display device is a device that receives an electrical signal and outputs an image through a display panel. Recently, the display panels such as a LCD, a PDP, and the like have been widely used, and such display panels are manufactured in a relatively thin plate shape. Accordingly, a slim display device is sometimes used by being fixed on a wall face or ceiling.

In one example, a storage cabinet, which is a kind of furniture in which a storage space is defined to store items therein, is used for various purposes, such as a clothing storage cabinet, a tool storage cabinet, a food storage cabinet and the like, depending on a type of the item stored.

However, conventionally, a separate space for installing the display module, such as a TV, a movie screen, a monitor, and the like therein is defined, and a separate drawer or a storage box for storing a cable and an auxiliary device therein is disposed in upper and lower portions or left, and right portions of the space, so that a manufacturing cost of the storage cabinet was high and space utilization was very low.

In addition, conventionally, there was no structure for easily coupling or mounting a wall-mounted TV or the like on furniture, so that furniture with the display module must be separately customized.

Further, the display module mounted on the conventional furniture has a disadvantage in that various cables or auxiliary devices are exposed to the outside, so that maintenance/management is cumbersome and a sensation of immersion in watching is reduced.

DISCLOSURE

Technical Problem

An embodiment of the present disclosure aims to provide a display device in which a display module and a storage cabinet are integrally formed, thereby improving space utilization.

Another embodiment of the present disclosure aims to provide a display device that may easily mount a display module on a storage cabinet.

Another embodiment of the present disclosure aims to provide a display device that has a separate space defined therein for mounting various cables or auxiliary devices therein, thereby facilitating maintenance/management, and improving a sensation of immersion in watching.

Technical Solutions

A display device according to an embodiment of the present disclosure may include a storage cabinet including a storage portion with an open front face defined therein, a moving plate disposed in front of the storage portion in a slidably movable manner in a horizontal direction, wherein the moving plate includes a first opening defined therein, a display module mounted on a front face of the moving plate to selectively cover a front face of the storage portion based on a position of the moving plate, and a mount bracket having one end fixed to a rear face of the display module, and an opposite end inserted into the first opening to be fastened to the moving plate.

The first opening may extend in a vertical direction, and a horizontal width of a lower portion of the first opening may be smaller than a horizontal width of an upper portion of the first opening.

The mount bracket may be inserted in the upper portion of the first opening and fixed in the lower portion of the first opening.

The opposite end of the mount bracket may include a head having a first diameter.

The first diameter may be smaller than the horizontal width of the upper portion of the first opening, and greater than the horizontal width of the lower portion of the first opening.

The mount bracket may include an extension disposed to be spaced apart from the head in a direction of said one end of the mount bracket.

The extension may have a diameter larger than the horizontal width of the upper portion of the first opening.

The mount bracket may include a neck disposed between the head and the extension, and having a diameter corresponding to the horizontal width of the lower portion of the first opening.

A distance between the head and the extension may correspond to a thickness of the moving plate.

The moving plate may include a jamming preventing wall protruding rearward at a position immediately above the first opening to restrict a moving range of the mount bracket.

The display device may further include a fixing member penetrating the mount bracket to be fixed to the display module.

The display module may include at least one hole defined in the rear face thereof for accommodating one end of the fixing member therein.

A central portion of the rear face of the display module may be mounted on the front face of the moving plate, so that the display module may cover an entirety of the front face of the storage portion when the moving plate is located at a reference position at a center in front of the storage portion.

The storage portion may include a first region having a front face exposed to the outside when the moving plate slides to the left, a second region having a front face exposed to the outside when the moving plate slides to the right, and a third region disposed between the first region and the second region, wherein a front face of the third region is always covered by the display module.

The display device may further include a driving cable located on the rear face of the display module.

The display device may further include a cable chain for guiding the driving cable to the third region.

The moving plate may include a second opening defined corresponding to a position of the driving cable of the display module.

The cable chain may have one end fixed adjacent to the second opening and an opposite end fixed in the storage portion.

The storage portion may include at least one partition wall partitioning the first region and the second region from each other or partitioning the first region and the third region from each other.

The partition wall may further include an indented portion indented rearward corresponding to a movement range of the cable chain.

The storage cabinet may further include a plurality of support legs for respectively supporting corners of a bottom face of the storage cabinet.

The display device may further include a speaker bar disposed beneath the storage portion.

The speaker bar may have a receiver for receiving a remote control signal disposed on a front face of the speaker bar.

The storage portion may mount an IR repeater for transmitting the remote control signal received from the receiver therein.

Advantageous Effects

According to an embodiment of the present disclosure, the display module and the storage cabinet are integrally formed, thereby improving the space utilization.

According to another embodiment of the present disclosure, the display module may be easily mounted on the storage cabinet.

According to another embodiment of the present disclosure, the separate space for mounting the various cables or auxiliary devices therein is defined, thereby facilitating the maintenance/management, and improving the sensation of immersion in watching.

Further scope of applicability of the present disclosure will become apparent from a detailed description below. However, various changes and modifications within the spirit and scope of the present disclosure may be clearly understood by those skilled in the art, so that it is to be understood that the detailed description and a specific embodiment, such as a preferred embodiment of the present disclosure, are given by way of example only.

BEST MODE

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Figure 1:
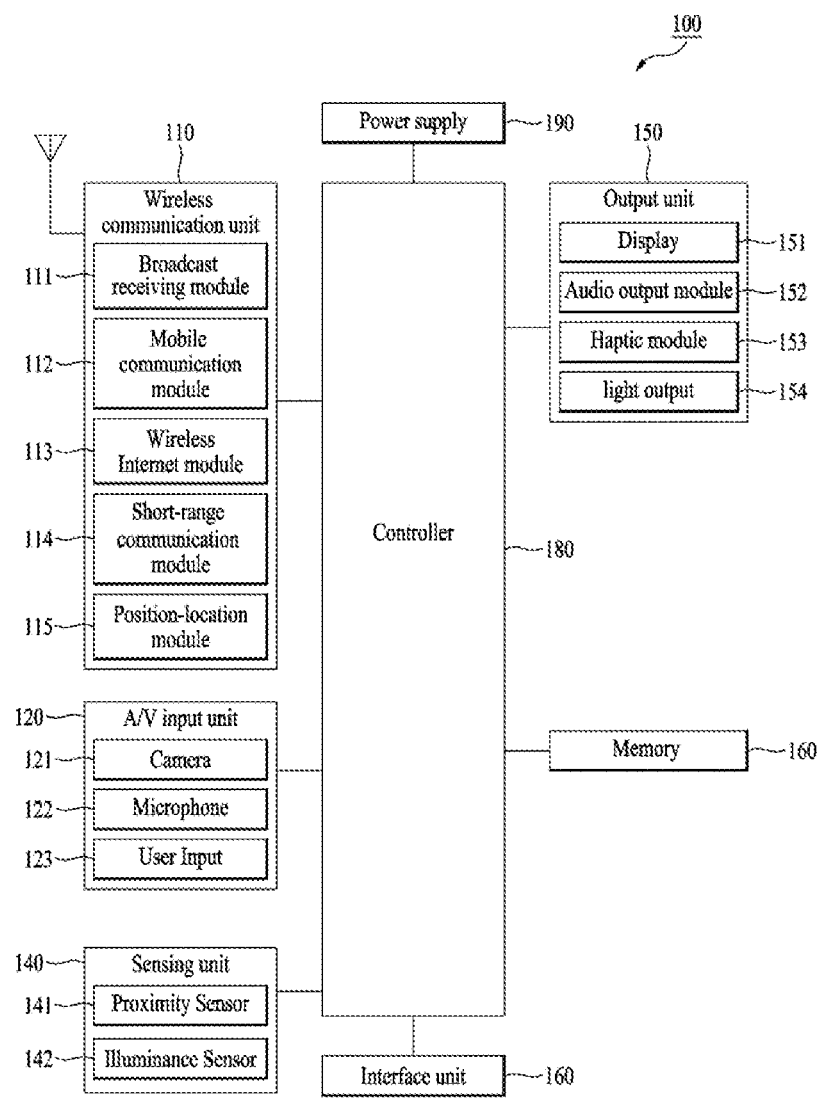
FIG. 1 is a block diagram for illustrating a display device associated with the present disclosure.

FIG. 1 is a block diagram for illustrating a display device associated with the present disclosure.

A display device 100 may include a wireless communication unit 110, an input unit 120, a sensing unit 140, an output unit 150, an interface unit 160, a memory 170, a controller 180, a power supply 190, and the like. Because the components shown in FIG. 1 are not essential to implement the display device, the number of components of the display device described herein may be greater or smaller than that of the components listed above.

More specifically, among the components, the wireless communication unit 110 may include at least one module that enables wireless communication between the display device 100 and a wireless communication system, between the display device 100 and another display device 100, or between the display device 100 and an external server. In addition, the wireless communication unit 110 may include at least one module that connects the display device 100 to at least one network.

Such wireless communication unit 110 may include at least one of a broadcast receiving module 111, a mobile communication module 112, a wireless internet module 113, a short-range communication module 114, and a position-location module 115.

The input unit 120 may include a camera 121 or an image input unit for an image signal input, a microphone 122 or an audio input unit for an audio signal input, and a user input unit 123 (e.g., a touch key, a push key (a mechanical key), and the like) for receiving information from a user. Audio data or image data collected by the input unit 120 may be analyzed and processed by a control command of the user.

The sensing unit 140 may include at least one sensor for sensing at least one of information on an interior of the display device, information on a surrounding environment of the display device, and user information. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150, which is for generating an output associated with a visual, auditory or tactile sense, may include at least one of a display 151, an audio output module 152, a haptic module 153, and a light output 154. The display 151 may form a layer structure with the touch sensor or be integrally formed with the touch sensor, thereby implementing a touch screen. Such a touch screen may function as the user input unit 123 that provides an input interface between the display device 100 and the user, and at the same time, may provide an output interface between the display device 100 and the user.

The interface unit 160 serves as a passage to various types of external devices connected to the display device 100. Such interface unit 160 may include at least one of a wired/wireless headset port, an external charger port, a wired/wireless data port, a memory card port, a port for connecting a device equipped with an identification module, an audio input/output (I/O) port, a video input/output (I/O) port, and an earphone port. In response to the connection of the external device to the interface unit 160, the display device 100 may perform appropriate control associated with the connected external device.

In addition, the memory 170 stores data that supports various functions of the display device 100. The memory 170 may store a plurality of application programs (or applications) driven on the display device 100, data for operation of the display device 100, and commands. At least some of such application programs may be downloaded from the external server through the wireless communication. In addition, at least some of such application programs may exist on the display device 100 from a time of shipment for basic functions (e.g., call receiving and making functions and message receiving and transmitting functions) of the display device 100. In one example, the application program may be stored in the memory 170 and installed on the display device 100 to be driven by the controller 180 to perform the operation (or the function) of the display device.

In addition to the operation associated with the application program, the controller 180 generally controls overall operations of the display device 100. The controller 180 may provide, to the user, or process appropriate information or functions by processing signals, data, information, and the like that are input or output through the above-described components or by running the application programs stored in the memory 170.

In addition, the controller 180 may control at least some of the components described with reference to FIG. 1 to drive the application program stored in the memory 170. Furthermore, the controller 180 may combine at least two of the components included in the display device 100 with each other and operate the combined components for the driving of the application program.

The power supply 190 receives external power and internal power under the control of the controller 180 and supplies power to each component included in the display device 100. The power supply 190 includes a battery. The battery may be a built-in battery or a replaceable battery.

At least some of the components may operate in cooperation with each other to implement an operation, control, or a control method of the display device according to various embodiments to be described below. In addition, the operation, the control, or the control method of the display device may be implemented on the display device by driving of at least one application program stored in the memory 170.

Hereinafter, embodiments of the present disclosure will be described by taking a display device 1000 shown in FIG. 2 as an example. However, in one example, the display device 1000 according to an embodiment of the present disclosure may be implemented as the display device 100 shown in FIG. 1. In addition, various embodiments of the present disclosure will be described later in detail with reference to FIGS. 2 to 8, and supplementary interpretation is possible with reference to the previous FIG. 1.

Figure 2:
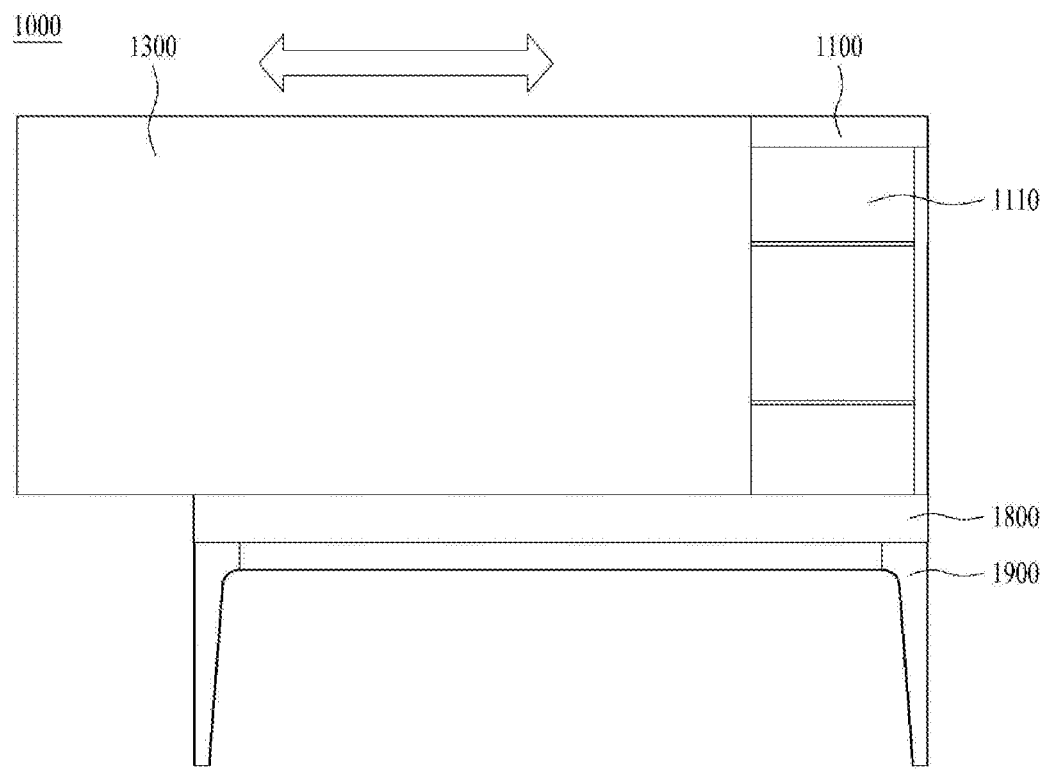
FIG. 2 is a diagram illustrating a display device according to an embodiment of the present disclosure.
Figure 2:
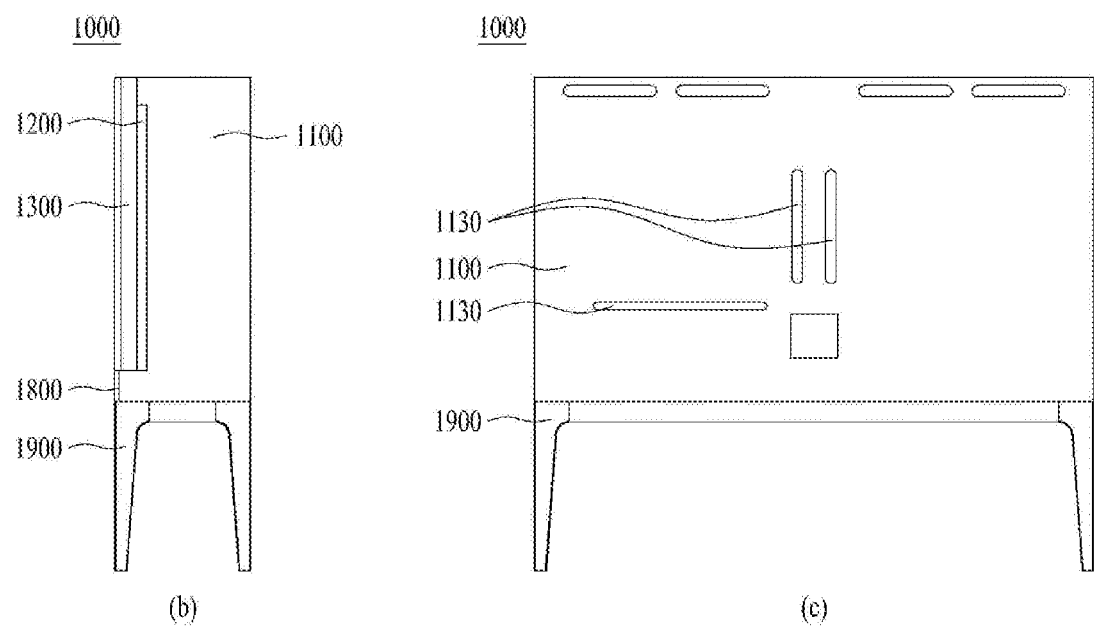

FIG. 2 is a diagram illustrating the display device 1000 according to an embodiment of the present disclosure.

(a) in FIG. 2 is a diagram illustrating a front face of the display device 1000. (b) in FIG. 2 is a diagram illustrating a side face of the display device 1000. In addition, (c) in FIG. 2 is a diagram illustrating a rear face of the display device 1000.

Referring to (a) to (c) in FIG. 2, the display device 1000 includes a storage cabinet 1100, a display module 1300, a speaker bar 1800, and a support leg 1900.

The storage cabinet 1100 may be a rectangular piece of furniture capable of storing items therein. The storage cabinet 1100 includes a storage portion 1110 for storing the items therein.

The storage portion 1110 includes at least one storage space defined therein partitioned by a partition wall. A driving cable of the display module 1300 to be described later, an input/output terminal unit connected to the module 1300, an auxiliary device connected to the module 1300, or an electrical outlet for power supply may be mounted in the storage space. In this connection, the auxiliary device may be an electronic device such as a set-top box, a DVD player, or the like. A front face of the storage portion 1110 may be opened and covered by the display module 1300 to be described later.

Referring to (b) in FIG. 2, a handle groove 1120 that is indented to have a predetermined spacing from a rear face of the display module 1300 to enable an easy sliding manipulation of the user may be defined in a left or right side wall of the storage cabinet 1100.

Referring to (c) in FIG. 2, the storage cabinet 1100 may further include at least one ventilation slit 1130 defined in a rear face thereof for heat dissipation of the display module 1300 and the auxiliary device mounted in the storage portion 1110. The ventilation slit 1130 may be defined at a position where the auxiliary device to be described later is mounted or a position corresponding to a third region.

Referring to (a) to (c) in FIG. 2 again, the display module 1300 may be configured as an integrated module or device that displays an image on a front face thereof such as a TV, a monitor, or the like. For example, the display module 1300 may be a liquid crystal display module. The display module 1300 covers the front face of the storage portion 1110. The display module 1300 is disposed to be movable in a sliding manner in a horizontal direction to perform a function of a door that opens and closes the storage portion 1110. Specifically, the display module 1300 is mounted on a moving plate to be described later, and selectively covers the front face of the storage portion 1110 based on a position of the moving plate. Hereinafter, a structure for mounting the display module 1300 on the front face of the storage portion 1110 will be described in detail in FIGS. 3 to 5.

The speaker bar 1800 is disposed at a lower end of the storage cabinet 1100 to mount at least one speaker thereon.

The support leg 1900 supports a bottom of the storage cabinet 1100. The support leg 1900 includes a plurality of support legs to respectively support corners of a bottom face of the storage cabinet 1100.

Hereinafter, the moving plate on which the display module 1300 is mounted will be described in detail in FIG. 3.

Figure 3:
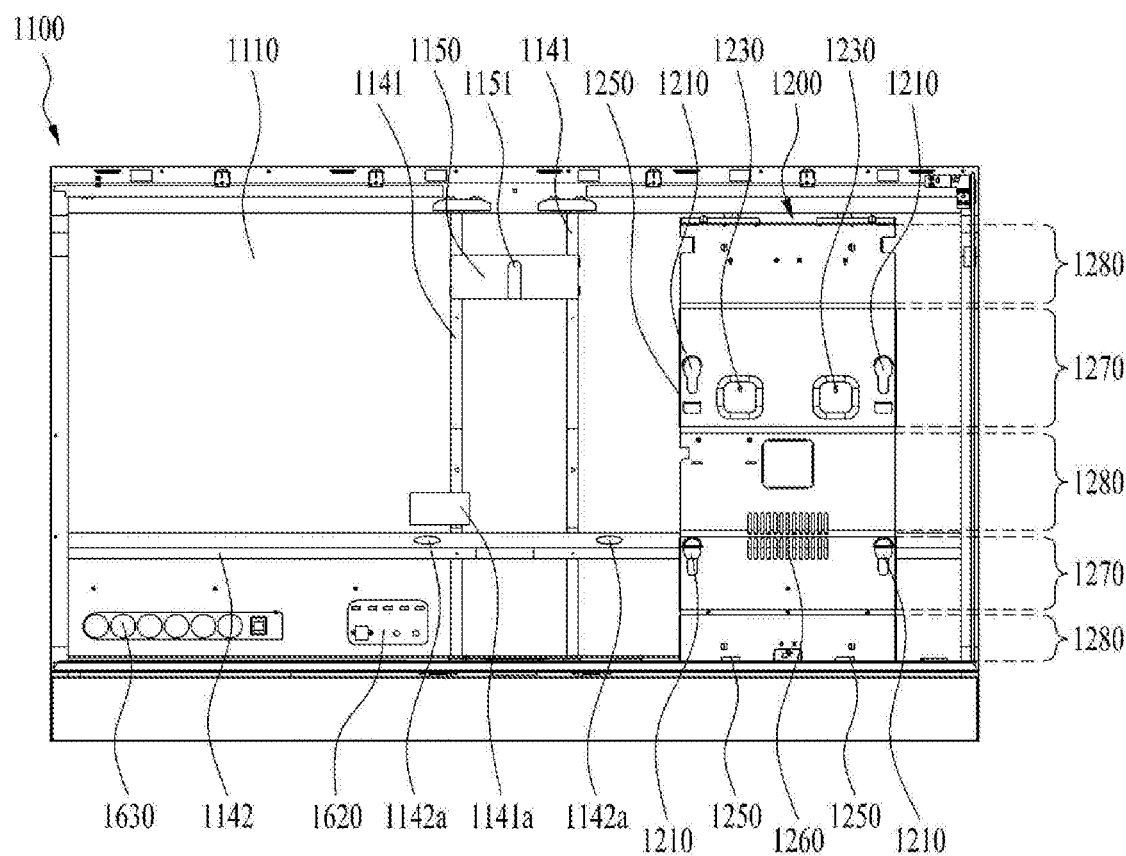
FIG. 3 is a diagram illustrating a display device before a display module according to an embodiment of the present disclosure is mounted thereon.

FIG. 3 is a diagram illustrating the display device 1000 before the display module 1300 according to an embodiment of the present disclosure is mounted thereon.

Referring to FIGS. 2 and 3, the display device 1000 may further include the moving plate 1200.

The moving plate 1200 is formed as a thin plate-shaped member and is movable in the sliding manner in the horizontal direction in front of the storage portion 1110. For example, rollers 1250 may be arranged at an upper end and a lower end of the moving plate 1200. In this connection, a rail (not shown) for accommodating the roller 1250 thereon may be formed at an upper end and a lower end of the front face of the storage portion 1110. The moving plate 1200 may cover a portion of the front face of the storage portion 1110.

The moving plate 1200 may further include a first opening 1210, a second opening 1220, an auxiliary coupling portion 1230, and a heat dissipating slit 1260.

The first opening 1210 is defined to extend in a vertical direction to accommodate a mount bracket to be described later therein. The first opening 1210 may include a plurality of first openings at predetermined spacings. In this connection, the predetermined spacing may be a spacing based on a video electronics standards association (VESA) standard. Accordingly, the existing display module 1300, such as a wall-mounted TV, may be mounted on the moving plate 1200 as it is without any separate design change. Hereinafter, coupling of the first opening 1210 and the mount bracket will be described in detail in FIGS. 4 and 5.

The second opening 1220 is defined at a position corresponding to a position at which the driving cable to be described later is connected to the rear face of the display module 1300. For example, the moving plate 1200 is disposed to cover a region to which the driving cable at a center of the rear face of the display module 1300 is connected, and the second opening 1220 may be defined at a center of the moving plate 1200. Hereinafter, the second opening 1220 and the driving cable will be described in detail in FIG. 6.

The auxiliary coupling portion 1230 is indented by a predetermined distance in a spaced portion in a direction of a rear face of the display to adjust the spacing between the rear face of the display module 1300 and the moving plate 1200, so that the mount bracket to be described later may be accurately mounted in the first opening 1210. For example, the auxiliary coupling portion 1230 may be formed between the first openings 1210 respectively defined at both left and right ends of the moving plate 1200. The auxiliary coupling portion 1230 may be formed at a position close to the first opening 1210. The auxiliary coupling portion 1230 may include a screw coupling hole defined therein for accommodating therein a screw for fixing the moving plate 1200 on the rear face of the display module 1300 after mounting the display module 1300.

The heat dissipating slit 1260 is defined at a position corresponding to a position at which a heat generating component such as a driver of the display module 1300 is mounted to assist heat dissipation of the display module 1300. For example, the heat dissipating slit 1260 may be defined at a position corresponding to a heat dissipating slit or a ventilation hole of the display module 1300 defined at a lower central region of the rear face of the display module 1300.

Some regions of the moving plate 1200 may be in close contact with the rear face of the display module 1300, and the remaining regions may be spaced apart from the rear face of the display module 1300. In other words, the moving plate 1200 may be formed such that a cross-section thereof has an uneven shape to define a space for accommodating the mount bracket to be described later therein. Specifically, the moving plate 1200 may include at least one spaced portion 1270 indented rearward to be spaced a predetermined distance from the rear face of the display module 1300, and at least one close contact portion 1280 protruding forward to be in close contact with the rear face of the display module 1300. In this connection, the first opening 1210 may be defined in the spaced portion 1270. Further, the second opening 1220 may be defined in the close contact portion 1280.

Referring to FIG. 3, as described above, the storage cabinet 1100 includes the storage portion 1110 in which the storage space is defined by at least one partition wall. In this connection, the auxiliary device such as an input/output terminal unit 1620, an electrical outlet 1630, or the set-top box may be mounted in the storage space. That is, for easy connection with the external device, a separate input/output terminal may not be disposed in the display module 1300, but the separate input/output terminal may be disposed in the storage space and be connected to the display module 1300 by the driving cable to be described later.

A plurality of partition walls 1141 and 1142 may be arranged to cross the interior space of the storage portion 1110 horizontally or vertically. The partition walls 1141 and 1142 include at least one vertical partition wall 1141 and a horizontal partition wall 1142.

The vertical partition wall 1141 is disposed to vertically cross the internal space of the storage portion 1110. For example, the vertical partition wall 1141 may be disposed to be spaced apart from a center of the storage portion 1110 to the left or the right by a predetermined spacing to partition a central space inside the storage portion 1110. A plurality of vertical partition walls 1141 may be arranged to partition the internal space of the storage portion 1110 to define the third region to be described later. The vertical partition wall 1141 may include a cable chain connector 1141a at a position adjacent to the rear face of the display module 1300.

The horizontal partition wall 1142 is disposed to cross the interior space of the storage portion 1110 horizontally. The horizontal partition wall 1142 may include at least one cable through-hole 1142a at a position adjacent to the vertical partition wall 1141 defining the third region to be described later.

The storage cabinet 1100 may further include a center bracket 1150 connecting the vertical partition walls 1141 with each other.

The center bracket 1150 is disposed in front of the storage portion 1110 to maintain a spacing between the partition walls. The center bracket 1150 may include a stopper 1151 temporarily stopping the sliding of the moving plate 1200. Hereinafter, the stopper 1151 will be described in detail in FIG. 8.

Figure 4:
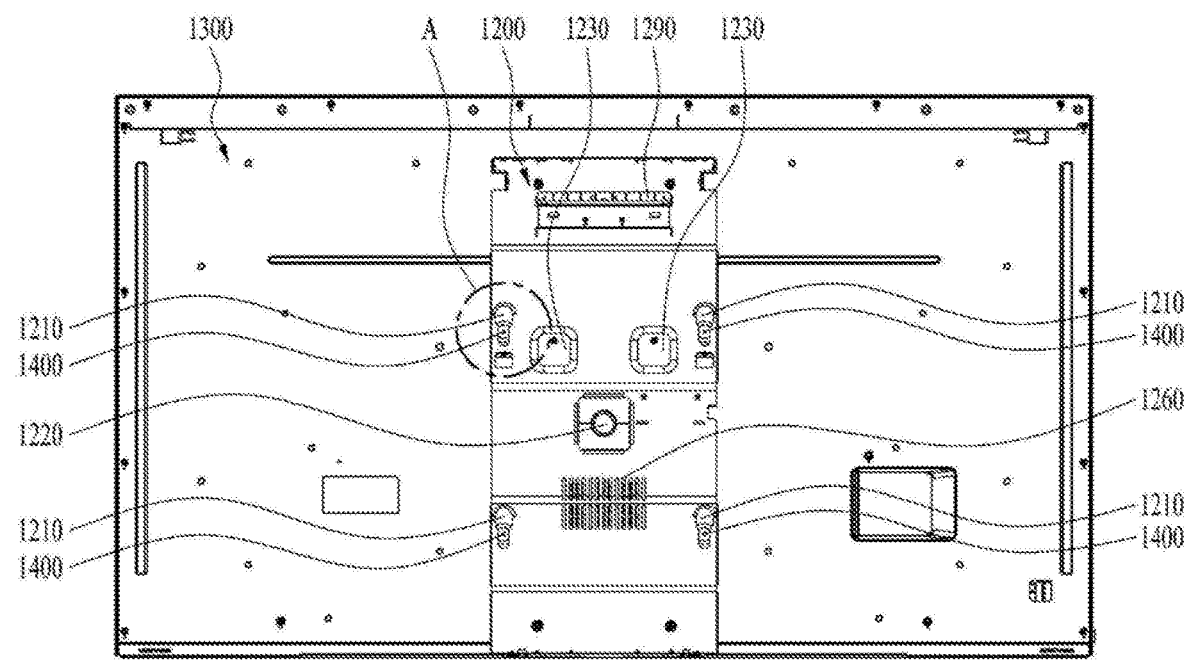
FIGS. 4 and 5 are diagrams illustrating a coupling relationship between a display module and a moving plate of a display device according to an embodiment of the present disclosure.
Figure 5:
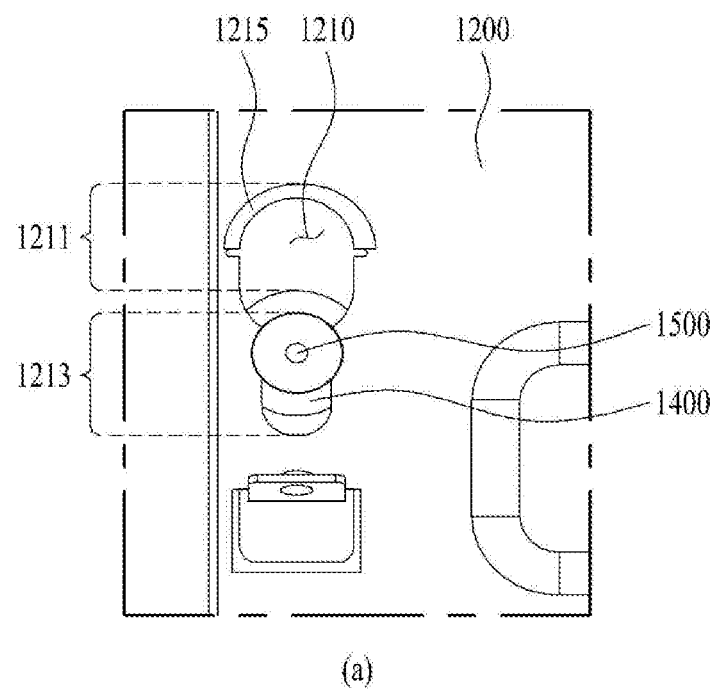
Figure 5:
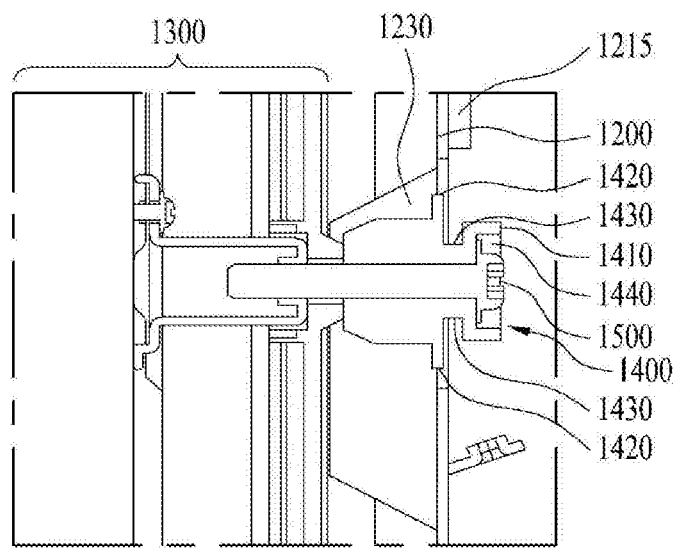

Hereinafter, a coupling relationship between the display module 1300 and the moving plate 1200 will be described in FIGS. 4 and 5. [95] FIGS. 4 and 5 are diagrams illustrating a coupling relationship between the display module 1300 and the moving plate 1200 of the display device 1000 according to an embodiment of the present disclosure.

FIG. 4 is a diagram showing the rear face of the display module 1300 to which the moving plate 1200 is coupled.

For convenience of description, illustration of the storage cabinet 1100 is omitted in FIGS. 4 and 5.

Referring to FIGS. 2 to 5, the display device 1000 may further include a mount bracket 1400 for mounting the display module 1300 on a front face of the moving plate 1200. One end of the mount bracket 1400 is fixed to the rear face of the display module 1300, and an opposite end is inserted into the first opening 1210 to be fastened to the moving plate.

Referring to FIG. 4, a plurality of mount brackets 1400 may be fixed to the rear face of the display module 1300 at predetermined spacings. In this connection, the mount brackets 1400 may be fixedly inserted into a plurality of holes defined in the rear face of the display module 1300 based on the VESA standard, respectively.

A central portion of the rear face of the display module 1300 is mounted on the moving plate 1200, so that the display module 1300 covers an entirety of the front face of the storage portion 1110 when the moving plate 1200 is located at a reference position in front of the storage portion 1110. That is, the reference position is a position at which the display module 1300 covers the entirety of the front face of the storage portion 1110. Accordingly, the moving plate 1200 may slide the display module 1300 to the left and right by the same distance to stably distribute a load and maximize use of the storage portion 1110 located rearward.

The moving plate 1200 may include a head accommodating portion 1290 for temporarily fixing the moving plate 1200 at the reference position by accommodating a head of the stopper 1151 to be described later therein.

(a) in FIG. 5 is an enlarged view of A in FIG. 4. (b) in FIG. 5 is an enlarged view of a cross-section of A in FIG. 4.

Referring to (a) in FIG. 5, the first opening 1210 may include an upper portion 1211 into which the opposite end of the mount bracket 1400 is inserted first, and a lower portion 1213 connected to a lower end of the upper portion 1211 and extending downward. A horizontal width of the lower portion 1213 of the first opening 1210 is smaller than a horizontal width of the upper portion 1211 of the first opening 1210. Accordingly, as the mount bracket 1400 descends, the mount bracket 1400 is firmly fixed to the moving plate 1200.

The moving plate 1200 may include a jamming preventing wall 1215 for restricting a moving range of the mount bracket 1400 that protrudes rearward on the rear face of the moving plate 1200 at a position immediately above the first opening 1210.

Referring to (b) in FIG. 5, one end of the mount bracket 1400 is fixed to the rear face of the display module 1300, and the opposite end thereof is accommodated in the first opening 1210. The mount bracket 1400 may include a head 1410, an extension 1420, and a neck 1430.

The head 1410 is formed at the opposite end of the mount bracket 1400 and has a first diameter. In this connection, the first diameter is smaller than a horizontal width of the upper portion 1211 of the first opening 1210 and is larger than a horizontal width of the lower portion 1213 of the first opening 1210. In addition, the first diameter may be larger than a diameter of one end of the mount bracket 1400.

The extension 1420 is disposed to be spaced apart from the head 1410 in a direction of one end of the mount bracket 1400, and has a diameter greater than a width of the first opening 1210. The extension 1420 allows easy mounting of the display module 1300 by restricting an insertion depth of the head 1410. In this connection, a distance between the head 1410 and the extension 1420 corresponds to a thickness of the moving plate 1200.

The neck 1430 is formed between the head 1410 and the extension 1420, and has a diameter corresponding to the horizontal width of the lower portion 1213 of the first opening 1210.

Referring to (a) and (b) in FIG. 5, the display device 1000 further includes a fixing member 1500.

The fixing member 1500 passes through the mount bracket 1400, so that one end of the fixing member 1500 is accommodated in a hole defined in the rear face of the display module 1300. One end of the fixing member 1500 may be coupled to an inner bracket disposed inside the display module 1300. In the mount bracket 1400, a pocket portion 1440 for accommodating a head of the fixing member 1500 therein may be defined in the head 1410.

Figure 6:
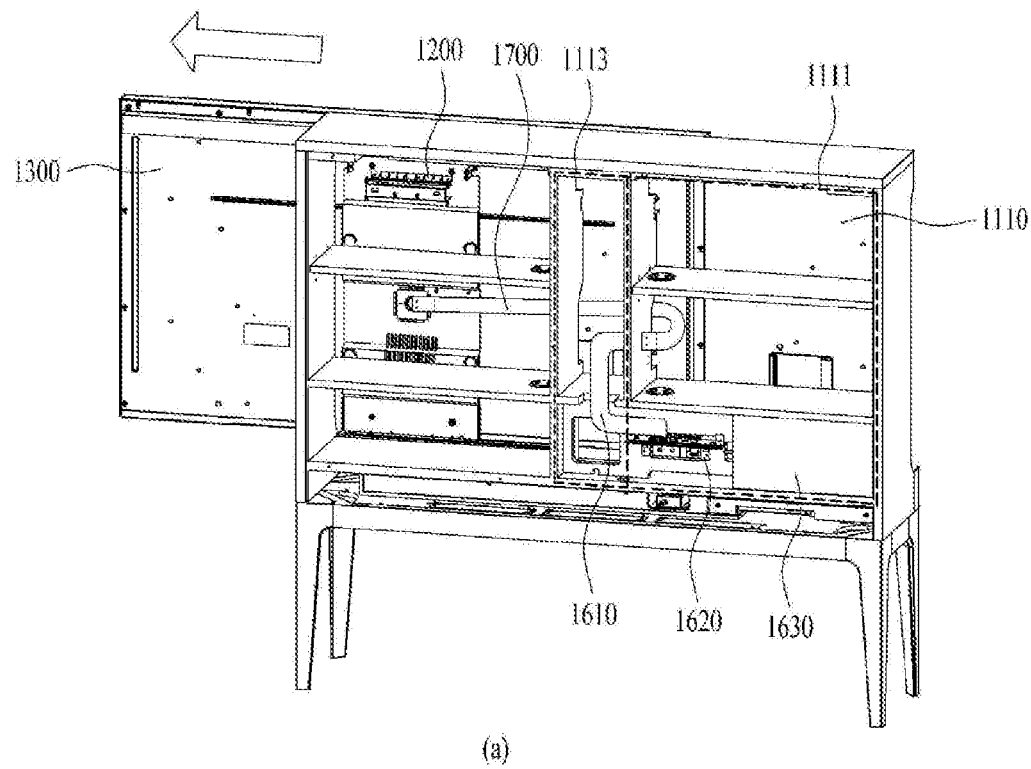
FIG. 6 is a diagram illustrating a rear face of a display device according to an embodiment of the present disclosure.
Figure 6:
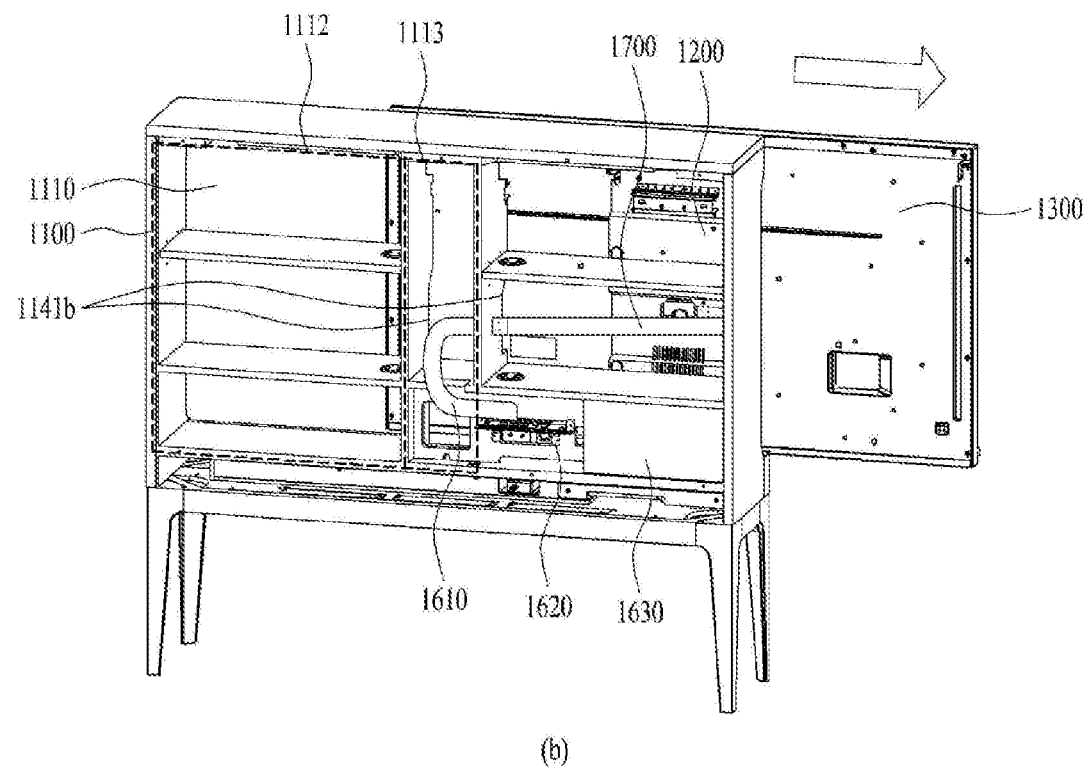

FIG. 6 is a diagram illustrating a rear face of the display device 1000 according to an embodiment of the present disclosure. For convenience of description, a rear face cover of the storage cabinet 1100 has been omitted.

(a) in FIG. 6 is a diagram illustrating a case in which the moving plate 1200 slides in a left direction. (b) in FIG. 6 is a diagram illustrating a case in which the moving plate 1200 slides in a right direction.

Referring to FIGS. 2 to 6, the display module 1300 is mounted on the front face of the moving plate 1200 to selectively cover the front face of the storage portion 1110 based on the position of the moving plate 1200. As described above, the central portion of the rear face of the display module 1300 is mounted on the moving plate 1200, so that the moving plate 1200 may slide to the left and right by the same distance.

Referring to (a) and (b) in FIG. 6, the storage portion 1110 includes a first region 1111, a second region 1112, and a third region 1113. The first to third regions 1111, 1112, and 1113 may be partitioned by the at least one partition wall.

The first region 1111 is a region on a right side of the storage portion 1110 exposed to the outside when the moving plate 1200 slides to the left. The input/output terminal unit 1620 and the electrical outlet 1630 may be arranged at a lower end of the first region 1111.

The second region 1112 is a region on a left side of the storage portion 1110 exposed to the outside when the moving plate 1200 slides to the right.

The third region 1113 is a region that is always covered by the display module 1300. Specifically, as a maximum moving distance to the left or right of the moving plate 1200 becomes equal to or less than ½ of a width of the front face of the storage portion 1110, a region at a center of the storage portion 1110 may always be covered by the display module 1300. The third region 1113 mounts a driving cable 1610 therein.

Widths of the first to third regions 1113 may vary based on the maximum moving distance of the moving plate 1200.

Referring to FIGS. 2 to 6, the display device 1000 may further include the driving cable 1610 and a cable chain 1700.

The driving cable 1610 has one end connected to the rear face of the display module 1300 and an opposite end connected to the input/output terminal unit 1620 disposed at the lower end of the storage portion 1110.

One end of the cabinet chain 1700 is fixed adjacent to the second opening 1220 and an opposite end thereof is fixed in the storage portion 1110, so that the driving cable 1610 is guided to the third region 1113 of the storage portion 1110, and the driving cable 1610 is protected such that a concentrated load does not occur in a specific portion.

Referring to (b) in FIG. 6, the partition wall may include an indented portion 1141*b* indented rearward corresponding to a movement range of the cable chain 1700.

Figure 7:
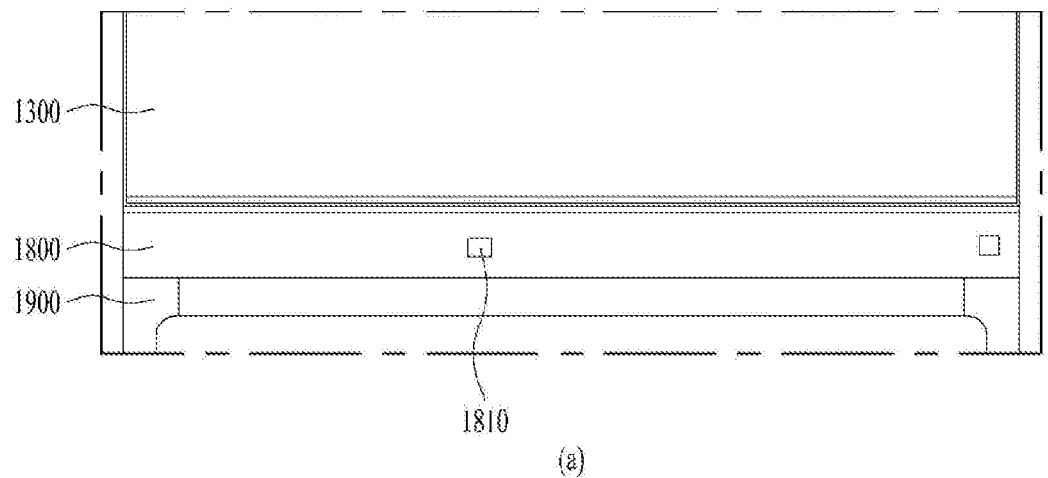
FIG. 7 is a diagram illustrating a receiver and an IR repeater of a display device according to an embodiment of the present disclosure.
Figure 7:
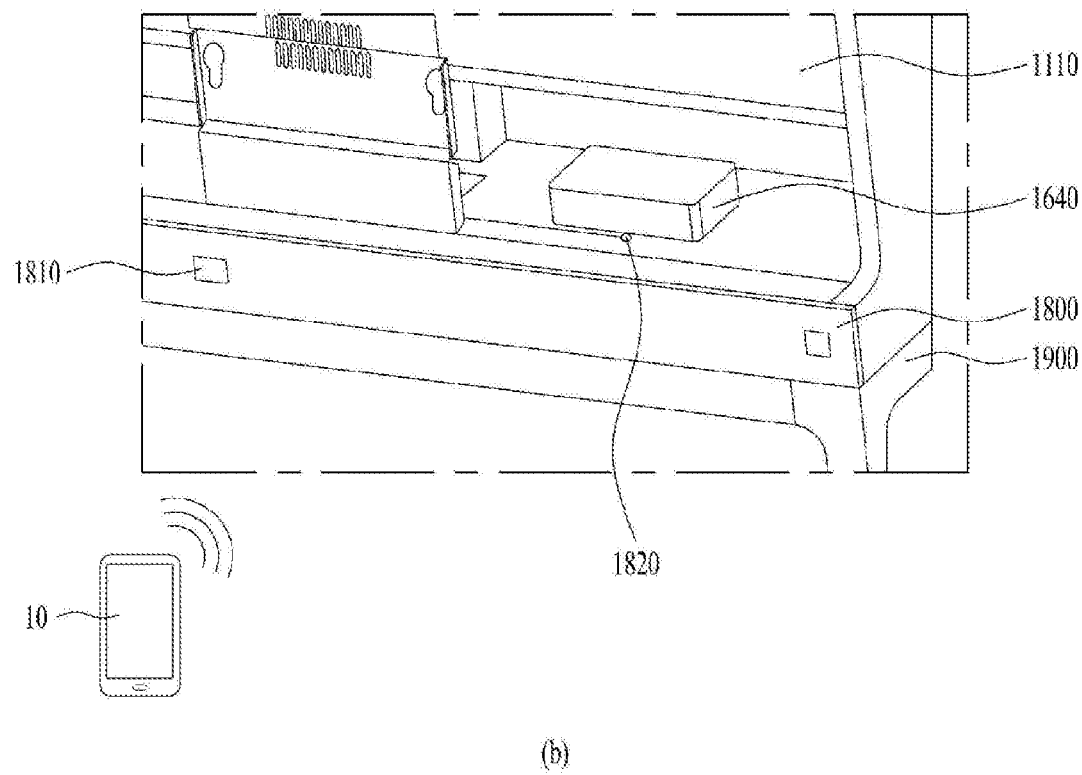

FIG. 7 is a diagram illustrating a receiver 1810 and an IR repeater 1820 of the display device 1000 according to an embodiment of the present disclosure.

(a) in FIG. 7 is an enlarged view of the front face of the display device 1000. (b) in FIG. 7 is a diagram illustrating an auxiliary device 1640 and the IR repeater 1820 mounted inside the storage portion 1110. For example, the auxiliary device 1640 may be a set-top box or a DVD player.

Referring to FIGS. 2 to 7, as described above, the display device 1000 may further include the speaker bar 1800 beneath the storage portion 1110.

Referring to (a) and (b) in FIG. 7, the speaker bar 1800 may have the receiver 1810 that receives a signal from the remote control 10 on a front face thereof. In this connection, the storage portion 1110 may mount therein the IR repeater 1820 that transmits the signal from the remote control 10 received from the receiver 1810. Therefore, when the display module 1300 completely covers the front face of the storage portion 1110, the IR repeater 1820 may transmit the signal from the remote control 10 to the auxiliary device 1640 such as the set-top box mounted inside the storage portion 1110.

Figure 8:
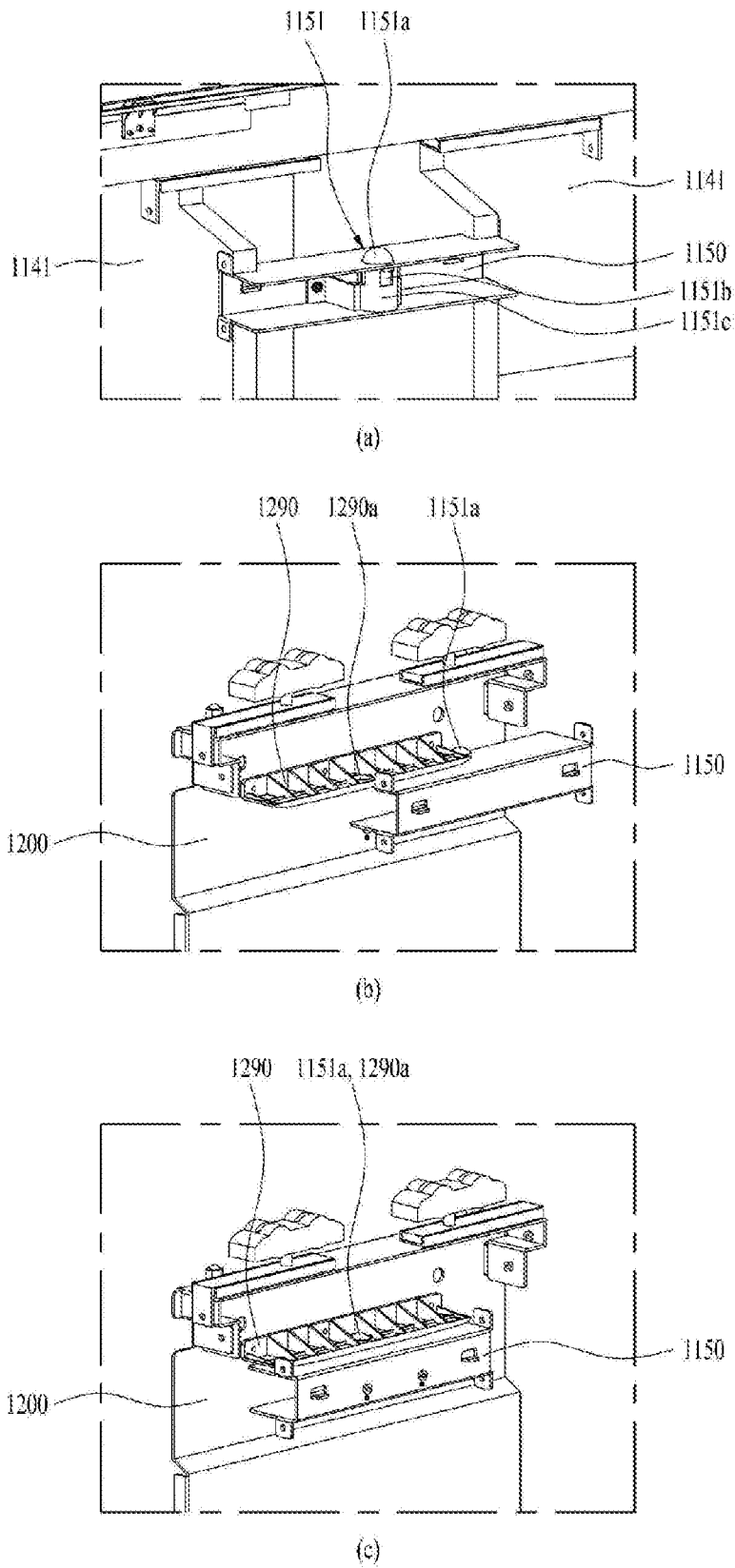
FIG. 8 is a diagram illustrating a center bracket and a stopper of a display device according to an embodiment of the present disclosure.

FIG. 8 is a diagram illustrating the center bracket 1150 and the stopper 1151 of the display device 1000 according to an embodiment of the present disclosure.

(a) in FIG. 8 is an enlarged view of an upper end of the vertical partition wall at which the center bracket 1150 is disposed. (b) in FIG. 8 is a diagram illustrating a case in which the moving plate 1200 deviates from the reference position. In addition, (c) in FIG. 8 is a diagram illustrating a case in which the moving plate 1200 is positioned at the reference position.

Referring to (a) in FIG. 8, the storage cabinet 1100 may further include the center bracket 1150 for connecting the vertical partition walls with each other.

The center bracket 1150 may be disposed between upper ends of the both vertical partition walls. The center bracket 1150 may include the stopper 1151.

The stopper 1151 is disposed at a center of the center bracket 1150 to temporarily fix the moving plate 1200 at the reference position. The stopper 1151 may further include a head 1151*a*, an elastic member 1151*b*, and a cylinder.

The head 1151*a* is disposed at the center of the center bracket 1150 and protrudes upward and downward with respect to a top face of the center bracket 1150.

The elastic member 1151*b* is disposed at a lower end of the head 1151*a* and presses the head 1151*a* upward.

The cylinder is formed at a center of the center bracket 1150, and has an open top, so that the head 1151*a* and the elastic member 1151*b* are accommodated in the cylinder in a vertically movable manner.

Referring to (b) and (c) in FIG. 8, the moving plate 1200 may further include a head accommodating portion 1290 on the rear face thereof.

The head accommodating portion 1290 includes a head accommodating hole 1290*a* that is defined at a vertical level corresponding to the center bracket 1150, and is for accommodating the head 1151*a* of the stopper 1151 therein. When the moving plate 1200 is located at the reference position, the head 1151*a* of the stopper 1151 is accommodated in the head accommodating hole 1290*a* to allow the moving plate 1200 to be fixed at the reference position. When the moving plate 1200 is not located at the reference position, a bottom face of the head accommodating portion 1290 extending horizontally to have a predetermined width presses the head 1151*a* downward, so that the head accommodating portion 1290 of the moving plate 1200 may move by a predetermined distance smoothly without being caught by the head 1151*a*.

An embodiment of the present disclosure aims to provide the display device in which the display module and the storage cabinet are integrally formed, thereby improving space utilization.

Another embodiment of the present disclosure aims to provide the display device that may easily mount the display module on the storage cabinet.

It is obvious to those skilled in the art that the present disclosure may be embodied in other specific forms without departing from the spirit and essential characteristics of the present disclosure.

Therefore, the detailed description above should not be construed as restrictive in all respects and should be considered as illustrative. The scope of the present disclosure should be determined by rational interpretation of the appended claims, and all changes within the equivalent scope of the present disclosure are included in the scope of the present disclosure.

The invention claimed is:

1. A display device comprising: a storage cabinet including a storage portion with an open front face defined therein; a moving plate disposed in front of the storage portion in a slidably movable manner in a horizontal direction, wherein the moving plate includes a first opening defined therein; a display module mounted on a front face of the moving plate to selectively cover a front face of the storage portion based on a position of the moving plate; and a mount bracket having a first end fixed to a rear face of the display module, and a second end inserted into the first opening to be fastened to the moving plate; and a fixing member penetrating the mount bracket to be fixed to the display module, wherein the display module includes at least one hole defined in the rear face thereof for accommodating one end of the fixing member therein, and wherein the mount bracket includes: a head having a first diameter at the second end of the mount bracket, wherein the first diameter is smaller than a horizontal width of an upper portion of the first opening, and greater than a horizontal width of a lower portion of the first opening; an extension having a second diameter and disposed to be spaced apart from the head in a direction of said first end of the mount bracket, wherein the second diameter is larger than the horizontal width of the upper portion of the first opening; and a neck disposed between the head and the extension, and having a diameter corresponding to the horizontal width of the lower portion of the first opening.

2. The display device of claim 1, wherein the first opening extends in a vertical direction, wherein the horizontal width of the lower portion of the first opening is smaller than the horizontal width of the upper portion of the first opening, and wherein the mount bracket is inserted in the upper portion of the first opening and fixed in the lower portion of the first opening.

3. The display device of claim 1, wherein a distance between the head and the extension corresponds to a thickness of the moving plate.

4. The display device of claim 1, wherein the moving plate includes a jamming preventing wall protruding rearward at a position immediately above the first opening to restrict a moving range of the mount bracket.

5. The display device of claim 1, wherein a central portion of the rear face of the display module is mounted on the front face of the moving plate, so that the display module covers an entirety of the front face of the storage portion when the moving plate is located at a reference position at a center in front of the storage portion.

6. The display device of claim 5, wherein the storage portion includes:
 a first region having a front face exposed to the outside when the moving plate slides to the left;
 a second region having a front face exposed to the outside when the moving plate slides to the right; and
 a third region disposed between the first region and the second region, wherein a front face of the third region is always covered by the display module.

7. The display device of claim 6, further comprising: a driving cable boated on the rear face of the display module; and a cable chain for guiding the driving cable to the third region, wherein the moving plate includes a second opening defined corresponding to a position of the driving cable of the display module, wherein the cable chain has one end fixed adjacent to the second opening and a second end fixed in the storage portion.

8. The display device of claim 7, wherein the storage portion includes at least one partition wall partitioning the first region and the second region from each other or partitioning the first region and the third region from each other,
 wherein the partition wall further includes an indented portion indented rearward corresponding to a movement range of the cable chain.

9. The display device of claim 1, wherein the storage cabinet further includes a plurality of support legs for respectively supporting corners of a bottom face of the storage cabinet.

10. The display device of claim 1, further comprising:
 a speaker bar disposed beneath the storage portion,
 wherein the speaker bar has a receiver for receiving a remote control signal disposed on a front face of the speaker bar.

11. The display device of claim 10, wherein the storage portion mounts an IR repeater for transmitting the remote control signal received from the receiver therein.

* * * * *